United States Patent

Celi

Patent Number: 5,609,764
Date of Patent: Mar. 11, 1997

[54] EXTRACTION COLUMN OR TOWER WITH SEPARATE VOLUMES

[75] Inventor: Antonio M. Celi, Frosinone, Italy

[73] Assignee: In.Tec. International Environment Technology S.r.L., Frosinone, Italy

[21] Appl. No.: 382,185

[22] Filed: Feb. 1, 1995

[30] Foreign Application Priority Data

Feb. 8, 1994 [IT] Italy ................... RM94A0055

[51] Int. Cl.$^6$ ............................................. B01D 11/04
[52] U.S. Cl. ............................ 210/511; 210/634
[58] Field of Search ........................ 210/634, 511; 196/14.52; 422/256

[56] References Cited

U.S. PATENT DOCUMENTS

| | | | |
|---|---|---|---|
| 1,297,171 | 3/1919 | Holley et al. | 210/511 X |
| 2,861,027 | 11/1958 | Farmer | 210/511 X |
| 3,719,455 | 3/1973 | Ohono et al. | 196/14.52 X |

*Primary Examiner*—Frank Spear
*Attorney, Agent, or Firm*—Young & Thompson

[57] ABSTRACT

An extraction column includes: one or several vertically aligned stages; fittings for inletting a phase containing a component that is desired to be extracted; fittings for inletting an extracting phase; and fittings for outletting the two phases after treatment in the column. Each stage includes two volumes, an internal one inside an outer one in fluid communication with each other via an intermediate volume. The internal volume is intended to cause mixing between the phase containing the component that is desired to be extracted, and the extracting phase. The outer volume is intended to cause the reseparation of the two phases, the one from the other after the mixing happens. The two fittings, the one high, the other low, for the two phases after their separation, are arranged in a calm zone. There is also a device for adducing the two phases from the outlet fittings of the reseparation volume to a subsequent treatment stage.

2 Claims, 2 Drawing Sheets

EXTRACTION COLUMN OR TOWER WITH SEPARATE VOLUMES

FIELD OF THE INVENTION

The present invention relates to the field of extraction.

More particularly, the present invention relates to an extraction column or tower.

BACKGROUND OF THE INVENTION

Extraction columns or towers are devices wherein the mixing and the subsequent reseparation, generally in several subsequent passes, of two immiscible liquid and/or solid phases is realized in order to extract a component of one of the phases by means of the other one.

In an extraction column or tower, the component to be extracted is typically contained in water. The water is generally is heavier than the extracting phase, which is customarily made up of an organic solvent.

The countercurrent encounter between an aqueous phase containing the component to be extracted and an extracting phase, therefore, is realized by feeding the two phases respectively from the upper and the lower part of the extraction column or tower.

An extraction column or tower generally carries out the above mentioned mixing and subsequent separation in a repeated manner, in order to obtain an optimum separation of the desired component. This is realized through a structure with several operating sections, or stages. Each stage comprises a device for mixing the phases (for instance packings made up of material in pieces off various shapes, such as for instance Raschig rings, glass or ceramic saddle packings, perforated plates, or stirrers and the like). The extraction column or tower terminates at the top with a so called calm chamber, for the extracting phase after countercurrent extraction of the component to be extracted from the aqueous phase. The velocity in the calm chamber is such as to allow the reseparation of the phases.

The efficiency of an entire extraction column or tower is expressed by the concept of theoretical stages or "plates", which is equivalent to the number of discontinuous extractors in the entire column is expressed.

An extraction column or tower, be it with one or several stages, optimally performs both its quantitative and qualitative functions, when the diameter and height dimensional parameters have been set as near as possible to ideal ones that allow the most suitable remixing or diffusion for the treatment and an optimum subsequent reseparation in as short as time that as possible.

It is known that an efficient remixing or dispersion is achieved in a device having a diameter considerably smaller than the height, as in a large section two phases that are caused to encounter here, tend to produce channelization, and therefore travel reciprocally without splitting themselves into small masses. This splitting of the phases into small masses is necessary to achieve a good mass transfer, and therefore requires a high number of theoretical plates in the device. On the contrary, a fast and optimum reseparation is obtained in volumes wherein the measure of the surface is considerably higher than the height, as the larger cross section provides a greater ease of reseparation of the two phases due to the different surface tensions.

OBJECTS OF THE INVENTION

A problem relevant to prior arc extraction columns or towers is Chat the aforementioned ratio between height and cross section has contrasting largeness and smallness requisites respectively for the purposes of a good mixing and of a good reseparation. In the design of extraction columns or towers relatively small diameter variations are allowed, in order to obtain the necessary operating volume, which is a function of the quantity to be treated in a given time unit. One is compelled to intervene on the height of the column or tower, and this in each stage and, moreover, for several stages, all to the detriment of the reseparation/reseparations.

It turns out to be apparent, therefore, that whichever is the dimensional tradeoff, the columns or towers of this kind generally have the drawback that with them, one is never able to achieve the maximum dispersing effect together with a fast and optimum reseparation process.

The present invention has the object of providing an extraction column or tower that overcomes such a drawback, that is to say that avoids the aforementioned dimensional tradeoffs, so as to benefit from its ideal dimensioning for each one of its stages.

The above object is achieved, according to the teaching of the present invention, by providing for the stages or plates of an extraction column or tower, a structure having two volumes. One volume is completely enclosed by and is inside the other. The volumes are in fluid communication with each other, with the internal one intended to effect the mixing, and with the external one intended to effect the reseparation after the mixing.

Suitable fittings are provided for the single phases under treatment between the re-separation volume of a stage and the mixing volume of the immediately underlying and overlying stages.

The present invention affords the considerable advantage of providing an architecture of an extraction column or tower designable free from dimensional tradeoffs, "tailoring" it in each one of its stages according to the relevant ideal dimensioning for the process to be realized.

The present invention, again, affords the important advantage so that considerable reductions of volume are possible in the extraction columns or towers. This also gives very positive economic results, as with extraction columns or towers according to the present invention, it is possible to use extraction agents in a considerably lesser quantity.

SUBJECT OF THE INVENTION

Therefore, the present invention relates to an extraction column or tower, comprising one or several stages and means For inletting a phase containing a component that is desired to be extracted; means For inletting an extracting phase, and means for outletting the two phases after their treatment in the column or tower, each stage of which includes two volumes, one of which is inside the other one, in fluid communication with each other, the internal volume being intended to cause the mixing between the phase containing the component which is desired to be extracted, and the extracting phase to happen, the outer volume being intended to cause the reseparation of the two phases one from the other after the mixing, and including two outlets, an upper one and a lower one for the two phases after their separation in the calm zone, and including means for recirculating the two single phases from the respective outlets of the re-separation volumes to the subsequent treatment stage.

BRIEF DESCRIPTION OF THE DRAWINGS

The present invention will be best understood, and the characteristics and advantages thereof will be better understood, based on the following detailed disclosure of its preferred embodiment, given only as a matter of example, without any intended limitation of scope with reference to the annexed drawings, wherein.

DETAILED DESCRIPTION OF THE PREFERRED EMBODIMENT

Figure 1:
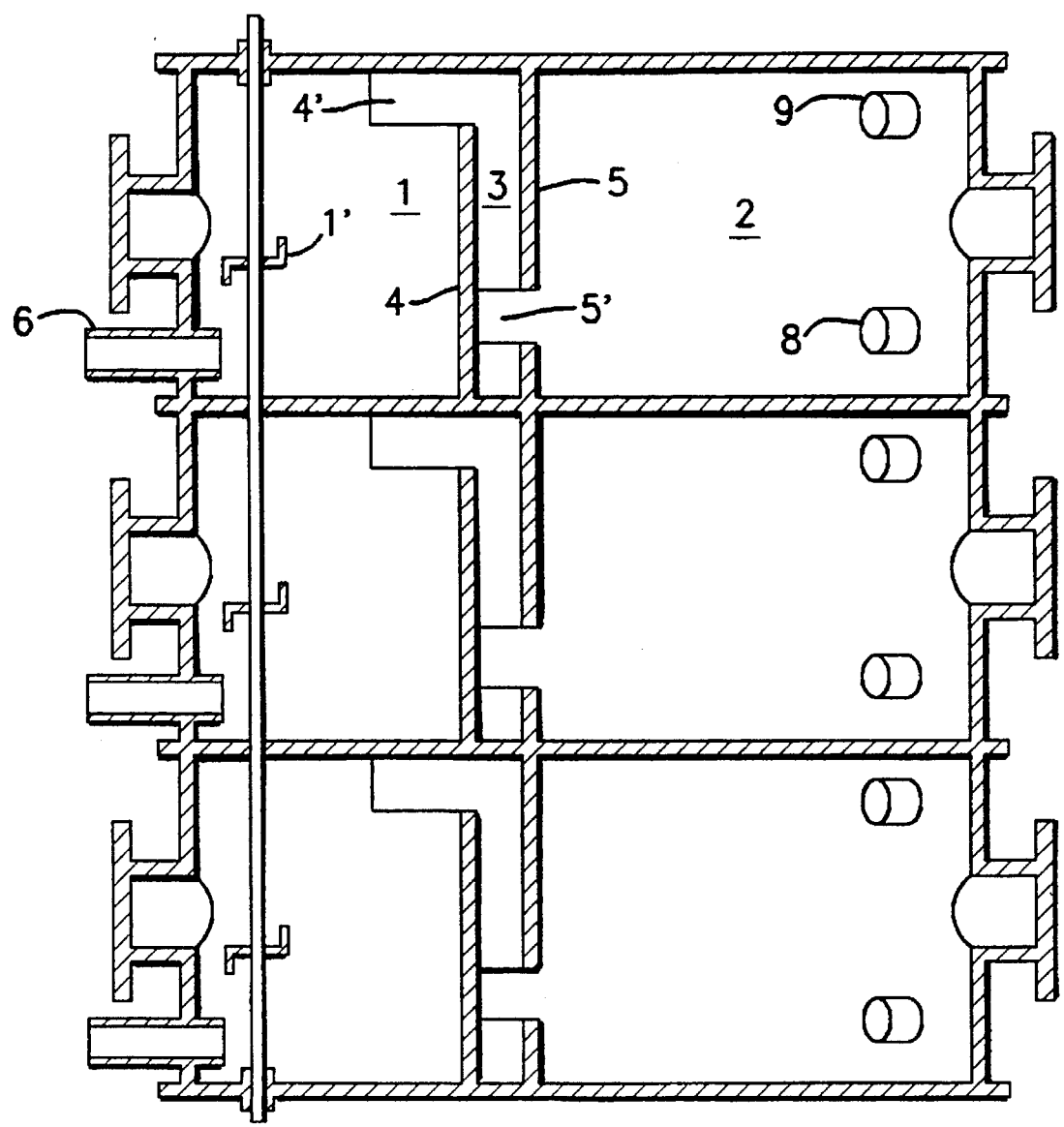
FIG. 1 represents a longitudinal section view of an extraction column or tower according to the present invention.
Figure 2:
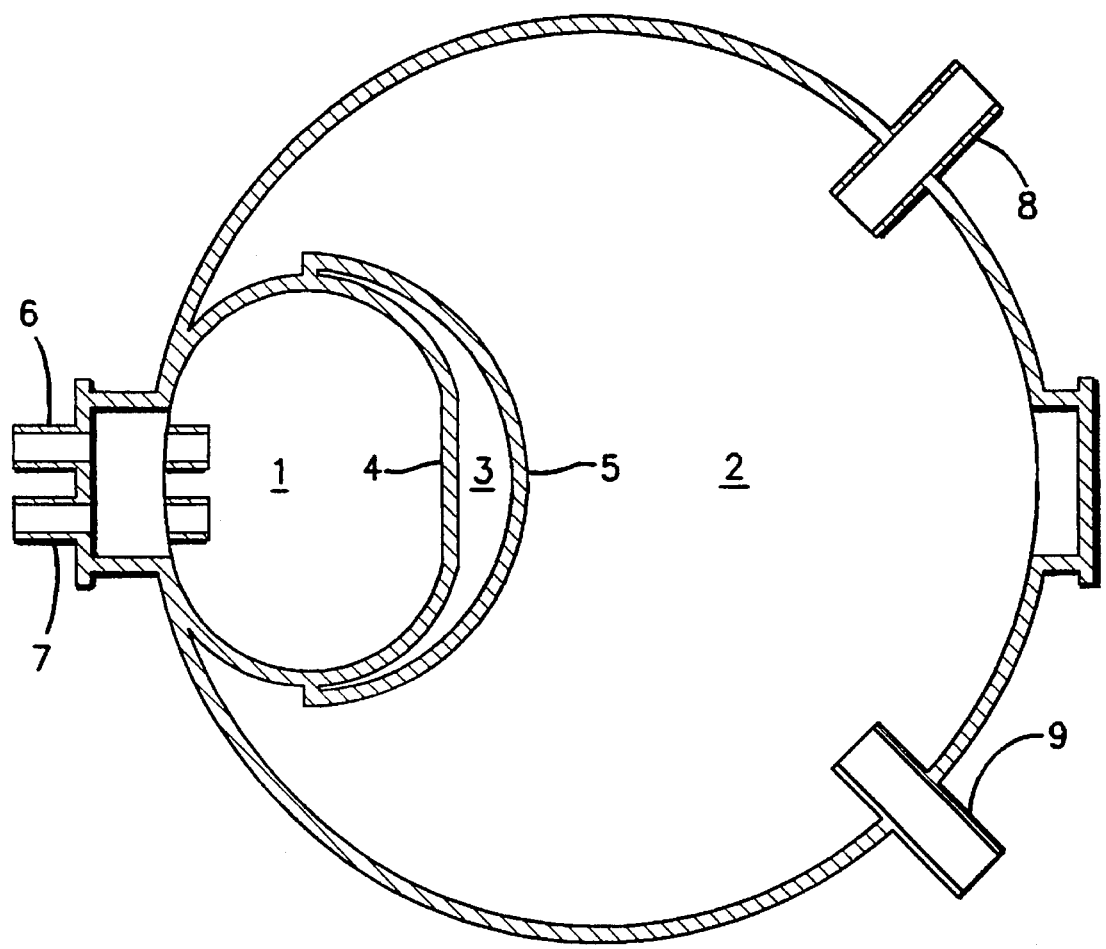
FIG. 2 is a top view of a stage of the same.

A stage of an extraction column or tower according to the teaching of the present invention comprises two volumes, and precisely a mixing volume 1 contained in an outer separation volume 2, having a circular cross section, as can be observed from FIGS. 1 and 2. The column taken as an example is built with three stages. The mixing volumes 1 have respective stirrers 1'.

The two volumes 1 and 2 are perfectly bound the one to the other, and communicate with each other through an intermediate volume 3, which is made up of and bound by the part of the mixing volume 1, a diaphragm 4, comprising apertures 4' in the extreme upper part, and a diaphragm 5, in turn comprising apertures 5' in a lower part.

The mixing volume 1 comprises two fittings 6 and 7 (see FIG. 2) for inletting the phase containing the component that is desired to be extracted and the extracting phase.

The separation volume 2 in turn comprises two fittings 8 and 9 (see FIG. 2) for the discharge of the two aforementioned phases after the separation. The two discharge fittings 8 and 9 are arranged respectively in the lower portion and in the upper portion in a position intended to be calm, that is to say where the liquids in the stage of separation are not animated with little movement.

The sizes of said fittings allow for the throughput given thereto.

In the operation of the column, the phase of lesser density or specific weight (usually the extracting organic solvent) is admitted through the fitting 6 of the lowest stage of the column, while the phase of greater density or specific weight (usually the acqueous solution containing the component to be extracted) is admitted through the top of the tower through the fitting 7 of the highest stage, for a countercurrent encounter.

In the case of a single stage, the two phases are admitted into the unique mixing volume 1 through the respective inlet fittings 6 and 7. The mixture from the mixing volume 1 flows through the diaphragm 3 and exits from a lower part into the separation volume 2. The two phases, after reseparation, leave the separation volume 2 through the higher outlet fitting 9 or lower outlet fitting 8 according to their respective density or specific weight.

From such fittings, through suitable connections, the two phases pass to the subsequent stages of the treatment, in the case of an extraction with several stages, as that under examination, through the respective fittings 6 and 7 to the column stage arranged immediately below. This happens apparently as many times as the number of arranged plates (in the present case, three).

The column in the disclosed arrangement allows the volumes to be fixed in a mutually independent manner, so as to allow for the designer an ideal dimensioning for both the mixing process and the subsequent separation process.

In order to render the advantages of the novel and original extraction column or tower according to the teaching of the present invention apparent, a process for extracting metals from a solution by means of an ion exchanger will now be disclosed.

For each liter of solution with metal content to be treated, and also independently of the quantity of metal to be treated, up to twenty (20) liters of ion exchanger are necessary.

From the experiences acquired up to how, it is known that the ideal proportion between the volume of mixing or dispersion and the volume of separation is of 1.4.5.

To obtain an almost complete extraction of the metal of the solution, the extraction process must be executed in a tower as disclosed above having three (3) stages.

In the present disclosure by "almost complete" extraction, it is meant that the unrecovered remainder can amount to a few milligrams per liter of solution.

A process for washing the ion exchanger liquid follows the extraction process in a column, this too having three stages, identical with the preceding one.

The operation follows this one of reextraction in a tower or column having three stages, then a subsequent washing in a two stage column.

Allowing for what is premised, it immediately turns out to be apparent the necessity of keeping the necessary volumes as small as possible, also because the ion exchanger is considerably costly. Parts of it during the treatment of the solution are lost, in a quantity directly porportional to the total quantity in circulation. The smaller the total quantity in circulation, the smaller the quantity lost in time, and therefore the more economically the process.

Into the mixing volume 1 of the highest stage of the extraction column, through the fitting 6 the solution to be treated is pumped in the appropriate volumetric proportions. Into the mixing volume 1 of the lowest stage of the extraction column through the fitting 7 the ion exchanger is pumped. The pumping operations are carried out at such a pressure as to be able to achieve a transfer of the liquids pumped into columns or towers connected in series or cascaded.

The two liquids as disclosed above enter into a first column or tower with a stirrer in operation, then undergo a mixing process and then are transferred to the representation volume. After subsequent passages, the heavy phase moves from the top to the bottom, the light phase moves from the bottom to the top. The extraction tower in the state of being completely full, will transfer the heavy phase, a solution now deprived of the metal, to various subsequent treatment stages;

the light phase, ion exchanger now loaded with metal, into a subsequent tower, for washing, of a constitution identical with the preceding one, an mentioned above and also admitted from the lowest stage of the tower, while also from the suitable fitting of the highest stage washing water is admitted. Here all will proceed as in the preceding tower and so on until all the towers are all full, then until the process is in operation.

Sulfuric acid, which is necessary for the reextraction, is admitted instead into the tower of solution containing metal or washing water.

The present invention has been disclosed and depicted with reference to a specific embodiment thereof, but it is to be expressedly understood that the details set forth are merely provided as a matter of example and are liable to a considerable span of modifications, additions and/or omissions, without so departing from the scope of the original teaching presented.

Therefore, the scope of protection of the present invention is intended to be only limited as defined in the appended claims.

I claim:

1. An extraction column comprising a plurality of vertically aligned stages; each stage including a settling chamber, and a mixing chamber disposed within said settling chamber; said mixing chamber being cotangential with said settling chamber, and having a smaller cross-sectional area than that of said settling chamber; first inlet means for introducing into said mixing chamber a phase containing a component that is desired to be extracted, and second inlet means for introducing into said mixing chamber an extracting phase; fluid communication means between said mixing chamber and said settling chamber; a first outlet means for withdrawing a lighter phase from an upper region of said settling chamber; a second outlet means for withdrawing a heavier phase from a lower region of said settling chamber; and wherein the first and second outlet means of an upper stage are respectively fluidly connected to the first and second inlet means of a lower stage.

2. An extraction column according to claim 1, wherein the mixing chamber of each stage includes stirring means.

* * * * *